United States Patent
Hans et al.

(10) Patent No.: US 9,367,586 B2
(45) Date of Patent: Jun. 14, 2016

(54) DATA VALIDATION AND SERVICE

(75) Inventors: Sandeep Hans, Haifa (IL); Sameep Mehta, New Delhi (IN); Soujanya Soni, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 368 days.

(21) Appl. No.: 13/562,417

(22) Filed: Jul. 31, 2012

(65) Prior Publication Data

US 2012/0310905 A1 Dec. 6, 2012

Related U.S. Application Data

(63) Continuation of application No. 13/150,331, filed on Jun. 1, 2011.

(51) Int. Cl.
*G06F 17/30* (2006.01)

(52) U.S. Cl.
CPC .................. *G06F 17/30507* (2013.01)

(58) Field of Classification Search
CPC ............ G06F 17/30507; H04L 67/2819; H04L 67/28; H04L 67/02
USPC ......................................................... 707/694
See application file for complete search history.

(56) References Cited

U.S. PATENT DOCUMENTS

| | | | |
|---|---|---|---|
| 6,535,883 B1 * | 3/2003 | Lee et al. ...................... 707/694 |
| 6,621,505 B1 * | 9/2003 | Beauchamp ........... G06Q 10/10 |
| | | | 715/700 |
| 7,328,428 B2 * | 2/2008 | Baugher ...................... 717/124 |
| 7,353,248 B1 * | 4/2008 | Kirkpatrick ......... H04L 67/2819 |
| | | | 707/999.1 |
| 7,558,856 B2 | 7/2009 | Moulton et al. |
| 7,599,901 B2 | 10/2009 | Mital et al. |
| 7,783,604 B1 | 8/2010 | Yueh |
| 8,364,845 B2 | 1/2013 | Richter |
| 2003/0046479 A1 * | 3/2003 | Noble ............... G06F 17/30507 |
| | | | 711/100 |
| 2006/0085459 A1 | 4/2006 | Noble et al. |
| 2006/0100941 A1 * | 5/2006 | Mariotti ................. G06Q 10/08 |
| | | | 705/28 |
| 2006/0242228 A1 | 10/2006 | Eggers et al. |
| 2007/0244735 A1 | 10/2007 | Mital et al. |
| 2009/0043733 A1 | 2/2009 | Kingsford et al. |
| 2009/0125796 A1 | 5/2009 | Day et al. |
| 2009/0290714 A1 * | 11/2009 | Charles ................. G06F 21/645 |
| | | | 380/278 |
| 2010/0042636 A1 | 2/2010 | Lu |

(Continued)

OTHER PUBLICATIONS

Sun Microsystems, "Solaris 9 Installation Guide", Apr. 10, 2009, available online: http://web.archive.org/web/20090410074922/http://www.shrubbery.net/solaris9ab/SUNWinab/SPARCINSTALL/p38.html.*

(Continued)

*Primary Examiner* — Brannon W Smith
(74) *Attorney, Agent, or Firm* — Cantor Colburn LLP

(57) ABSTRACT

A data validation service includes providing a user interface to a subscriber of the service via a computer device of the subscriber, receiving, via the user interface, a data validation rule specified by the subscriber and an address of a database subject to the data validation, and generating a configuration file that includes the address of the database and an address of a location of executable code corresponding to the data validation rule. The data validation service also includes transmitting the configuration file and remote methods to the computer device over the network. The remote methods are configured to execute the data validation rule with respect to the data and compile results of the execution.

5 Claims, 4 Drawing Sheets

(56) References Cited

U.S. PATENT DOCUMENTS

2010/0121902 A1    5/2010    Chandrasekhar et al.
2011/0016202 A1*  1/2011    Ye .................. H04L 41/044
                                                                       709/222

OTHER PUBLICATIONS

Christopher M. French and Neno Duplancic, "Application of Six Sigma Methods for Improving the Analytical Data Management Process in the Environmental Industry", National Ground Water Association, Ground Water Monitoring & Remediation 26, No. 2, Spring 2006, pp. 58-61.

Haitao Du et al., "Design and Actualization of SOA-based Data Mining System", Institute of Manufacturing and Controlling, Wuhan University of Technology, Computer-Aided Industrial Design and Conceptual Design, 2008. Nov. 22-25, 2008. pp. 338-342.

Vadim Surpin, "An approach to data validation based on lifecycle-bounded metadata", pp. 33-36, Prodeedings of the 4th Spring/Summer Young Researchers' Colloquium on Software Engineering, Nizhny Novgorod, Russia, Jun. 1-2, 2010.

* cited by examiner

DATA VALIDATION AND SERVICE

CROSS-REFERENCE TO RELATED APPLICATION

This application is a continuation of U.S. patent application Ser. No. 13/150,331, filed Jun. 1, 2011, the disclosure of which is incorporated by reference herein in its entirety.

BACKGROUND

The present invention relates to data validation, and more specifically, to providing data validation as a service.

Advancements in analytics and optimization solutions to perform simulation, prediction, gap analysis, risk assessment, reporting, and other activities, assist organizations in making well-informed and timely decisions. Such analysis relies on the presence of correct data as input to provide any realistic solution.

In large organizations, different data may be owned by different competencies. For example, Human Resources may own and maintain all employee data, whereas Payroll may be responsible for the financial data for each employee. Typically, the data is maintained in the format that best suits the data owners. Each system may have its own schema, format, access methods, and underlying technologies (e.g., DB2™ Oracle™, Excel™). The choice can be influenced by the skill availabilities of the data managers or may be influenced by existing legacy formats. For such disparate systems, simple database principles such as referential integrity cannot be enforced, even if the underlying technology is the same. For different technologies, the issues can become difficult to manage.

Data validation is typically not performed frequently. For example, most organizations perform such tests about once per day during a low activity period to flag all inconsistencies. Towards this end, many organizations typically either chose to develop the code base to perform data validation or adopt an existing industrial tool. However, developing the code base by an organization can be expensive, and existing tools on the market may not be designed to handle some of the unique validation checks required by an organization.

What is needed, therefore, is a way to provide data validation to various organizations as a service offering.

SUMMARY

According to an embodiment of the present invention, a method of performing data validation as a service is provided. The method includes providing a user interface to a subscriber of the service via a computer device of the subscriber, receiving, via the user interface, a data validation rule specified by the subscriber and an address of a database subject to the data validation, and generating a configuration file that includes the address of the database and an address of a location of executable code corresponding to the data validation rule. The method also includes transmitting the configuration file and remote methods to the computer device over the network, the remote methods configured to execute the data validation rule with respect to the data and compile results of the execution.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An exemplary embodiment of the invention includes a framework for enabling a data validation service offering. An exemplary architecture may be based on a Service Oriented Architecture (SOA) and implemented using an object-oriented programming language, such as Java™. To handle privacy of data for which the data validation needs to be performed, the architecture includes three different variants for the service, each of which caters to different levels of privacy. A first variant is a service provider centric approach, a second variant is a customer centric approach, and a third variant is a report centric approach, as will be described further herein.

Figure 1:
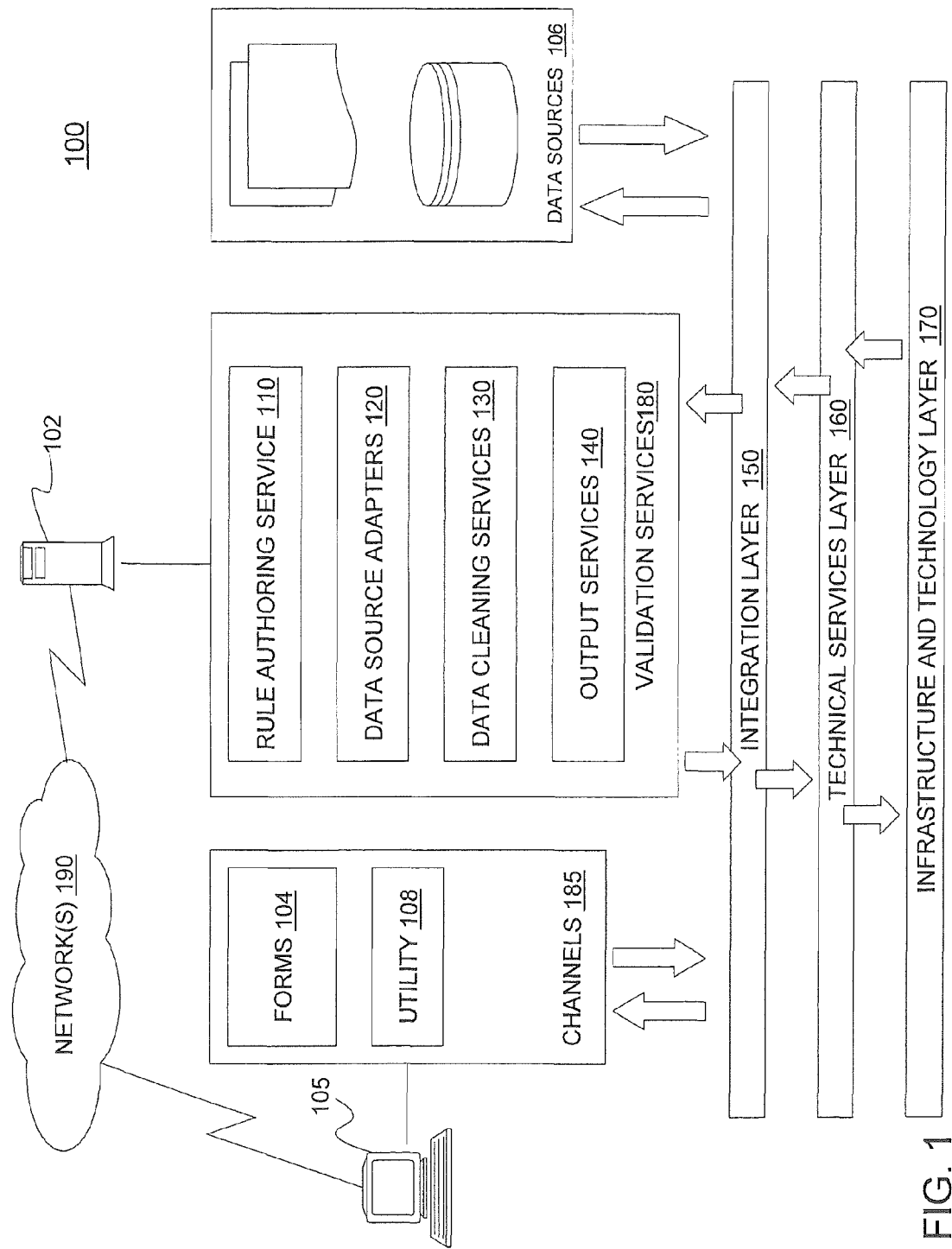
FIG. 1 is a block diagram of a system upon which data validation services may be implemented in an exemplary embodiment.

With reference now to FIG. 1, a system upon which the data validation services may be implemented in an exemplary embodiment will now be described. The system 100 includes a service provider system 102 in communication with a user system 105 over one or more networks 190.

The service provider system 102 provides the exemplary data validation services as a service offering to customers, such as the user system 105 over the network(s) 190. The service provider system 102 may be implemented as a high-speed computer processing device, such as a mainframe computer.

The user system 105 receives the data validation services, and may be operated by a user who is a representative of an organization that subscribes to the services or receives the services under an agreement with a service provider. The user system 150 may be implemented as a general-purpose computer processing device, (e.g., desktop, laptop, etc.) or may be a portable handheld device operating over a wireless network. It will be understood that the user system 105 may communicate over the networks 190 with the service provider system 102 using a variety of different channels 185, as will be described further herein.

The networks 190 may include any type of network or a combination of networks (e.g., local area network, wide area network, metropolitan area network, virtual private network, and public network). The networks 190 may include wireless and wireline technologies and protocols as are understood in the art.

The architecture of the system 100 may be implemented, e.g., as a SOA architecture including an integration layer 150, a technical services layer 160, and an infrastructure and technology layer 170, as described further herein.

As shown in FIG. 1, the service provider system 102 implements the data validation services offering through multiple components, collectively referred to as validation services 180, in conjunction with the layers 150, 160 and 170.

Also shown in the system 100 of FIG. 1 are data sources 106. The data sources 106 represent different data sources of the organization associated with the user system 105. Each data source 106 may contain one or more databases. The data sources 106 may employ varying storage systems, such as DB2™, SQL Server™, Oracle™, and Excel/CSV™, to name a few. Each data source 106 exposes its metadata model, which metadata model refers to a schema of the data source 106, in terms of a relational database management system (RDBMS). For .xls and .csv files, e.g., it may be the column headers. One or more utilities may be employed to generate and store the metadata models.

In an exemplary embodiment, the validation services 180 include four modules, a rule authoring service module 110, a data source adapter module 120, a data cleaning services module 130, and an output services module 140. It will be understood that the modules may be integrated as a single application or may be broken into additional components. The configuration of the four modules to provide the validation services 180 is provided herein by way of illustration and is not to be construed as limiting in scope.

The rule authoring service module 110 includes a user interface that is accessed by users/subscribers, e.g., a user of the user system 105 to specify rules for data validation through interactive forms (e.g., forms 104). In this manner, the validation services 180 enable individual organizations or customers to configure the particular types of data validation services desired based on organizational need. For example, the forms 104 may be used to enter the particular data sources 106 to be employed in the data validation services. The forms 104 may also be used to specify the rules and data types to be validated, as well as the frequency and timing of the data cleaning functions provided by the services 180.

In an embodiment, the user first uploads, e.g., through the user interface, the metadata model of the data sources 106 selected for data validation. The metadata model may be used by the validation services 180 to auto-populate drop down lists in the forms 104 provided by the user interface of the rule authoring service module 110. The user can select one or more databases from a drop down list. Different types of rules may be specified via the interface, as described further herein. The specified rules may be stored in a file (e.g., an XML file). The rule file is stored on the service provider side when the service provider centric approach of the validation services is used. The rule file may be stored on the customer side when the customer centric approach (and/or rule centric approach) is used.

In an exemplary embodiment, the data source adapter services module 120 is configured to fetch the metadata model and data from various databases (e.g., DB2, MS SQL, Oracle, Excel, etc.) in the data sources 106.

In an exemplary embodiment, the data cleaning services module 130 provides data cleansing for various data validation resolution issues, e.g., discovering records for which a field has value not in defined range or not in list of values, normalizing values of a field such as date, address, etc. The data cleaning services module 130 uses the metadata model and user-specified rules as input. The data cleaning services module 130 executes the rules. The user may define the mode of output (e.g., results of the data cleansing) via the rule authorizing service module 110 and user interface) when requesting any service (e.g., the user may request a .csv file that includes the data violating a specified rule). In any case, output from the execution of the data cleaning services module 130 is provided to the output services module 140.

The output services module 140 takes the output generated by the data cleaning services module 130 and packages it in a format requested by the user. For example, formats may include flat text and PDF reports.

In an embodiment, the integration layer 150 acts as a liaison among the validation services 180 modules and other layers 160, and 170 in the system 100. Tasks performed by the integration layer 150 may include handling communications between different modules 110, 120, 130, and 140 and generating configuration files based on the user requests. The configuration files detail the web services required to serve a particular data validation request. For example, the configuration files may include the address of the data sources 106, locations of relevant executables, the mode of execution, reporting formats, etc. The integration layer 150, in conjunction with the technical services layer 160, may provide security for the system 100 (e.g., user authentication and authorization may be handled by the integration layer 150 and the technical services layer 160). Audit trail and logs may be generated in the technical services layer 160.

In an embodiment, the infrastructure and technology layer 170 handle policies and industry fabric. The infrastructure and technology layer 170 may be used to integrate policies (e.g., regarding security, logging or business policies), industry standards including security standards, and any sector level standards. This layer 170 may also be responsible for adapting to changes in underlying technology changes and interaction with the physical infrastructure (e.g., a local area network or wide area network), storage, etc.

As indicated above, privacy issues are a concern in providing data validation tasks. The validation services 180 contemplate three different variants of the data validation services to handle different levels of privacy: provider centric, customer centric, and report centric.

Figure 2:
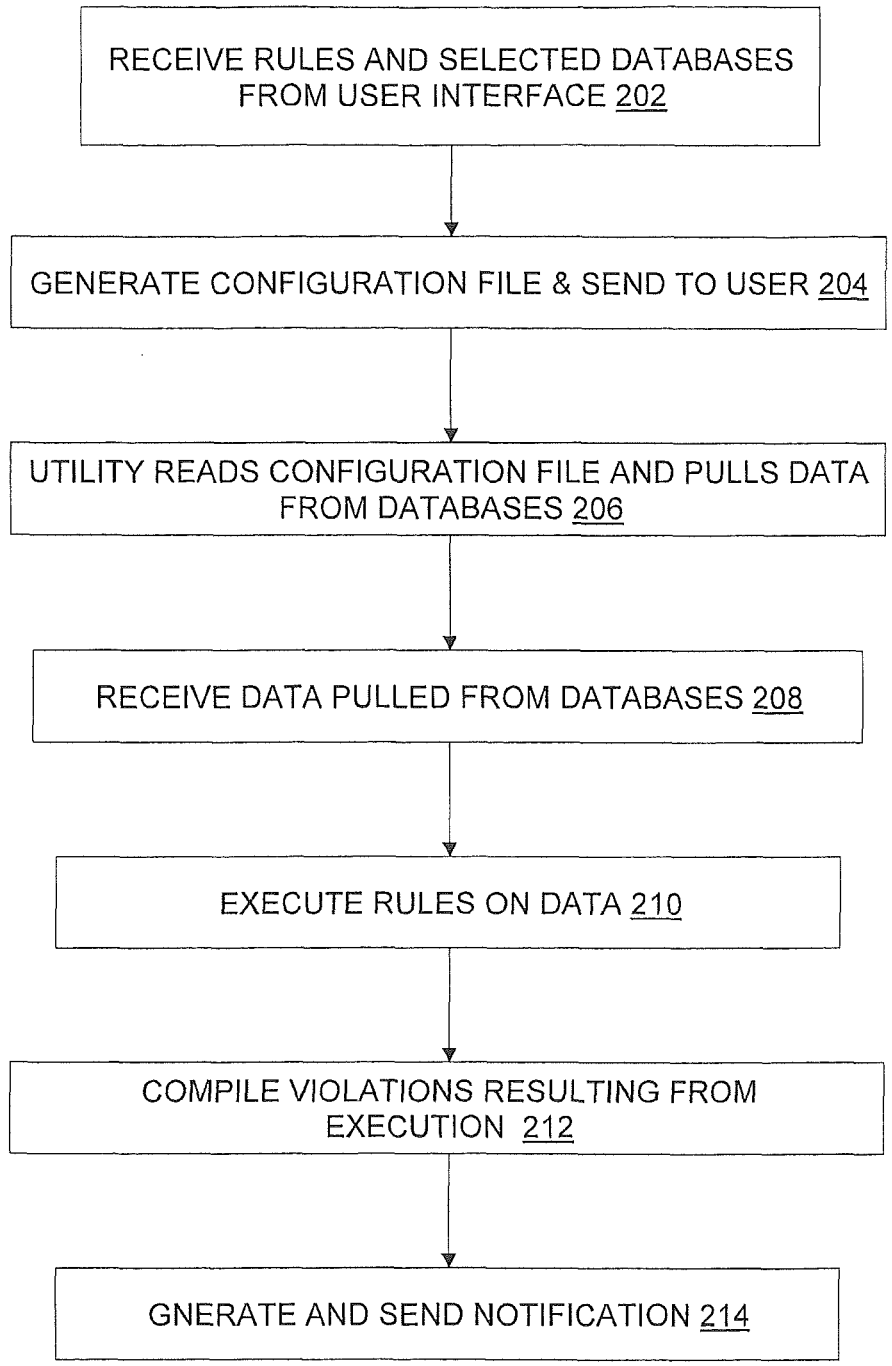
FIG. 2 is a flow diagram describing a process for implementing data validation services using a service provider centric approach in an exemplary embodiment.

Turning now to FIG. 2, a service provider centric approach (also referred to herein as 'provider centric approach') to implementing the data validation services offering will now be described in an exemplary embodiment. In the provider centric approach, the actual processing of the data is performed at the service provider system side whereby relevant data is transferred from the customer side (e.g., the organization side) to the service provider system 102. This approach may result in lower privacy and higher latency than the customer centric approach; however, no additional investment is required on the customer side either in terms of software or computational power.

At step 202, a user of the user system 105 accesses the user interface of the rules authoring service module 110 and specifies the rules via the form 104. The rules are converted to a file (e.g., XML file). The user selects the databases from the data sources 106 for which the data validation services are desired. The databases may be identified by their location (e.g., address) in the data sources 106.

At step 204, the data in the form 104 is used by the validation services 180 to generate a configuration file. The configuration file is passed from the rules authoring service module 110 to the user system 105 via the networks 190 and the integration layer 150.

At step 206, the user system 105 pulls the appropriate data from one or more databases in the data sources 106 through a lightweight utility 108 (e.g., a thin client application) downloaded on the user side. The utility 108 reads the configuration file, pulls the specified metadata (e.g., columns, if the database is in Excel) via the data source adapter services module 120 and packages the data in a pre-agreed data exchange format (e.g., XML, txt, etc.).

At step 208, the metadata and the data is transmitted to the validation services 180 of the service provider system 102 via the networks 190 and the integration layer 150. The metadata model may also be transmitted.

At step 210, the data cleaning services module 130 executes the rules with respect to the data and the metadata model to perform the data validation.

At step 212, violations detected from the execution are compiled and sent to the output services 140 via the integration layer 150. The output services module 140 formats the results according to a user-specified format (e.g., a format identified in the configuration file).

At step 214, a notification is generated and sent to designated entities signaling completion of the data validation process and providing a link to validation reports in the user-specified format.

Figure 3:
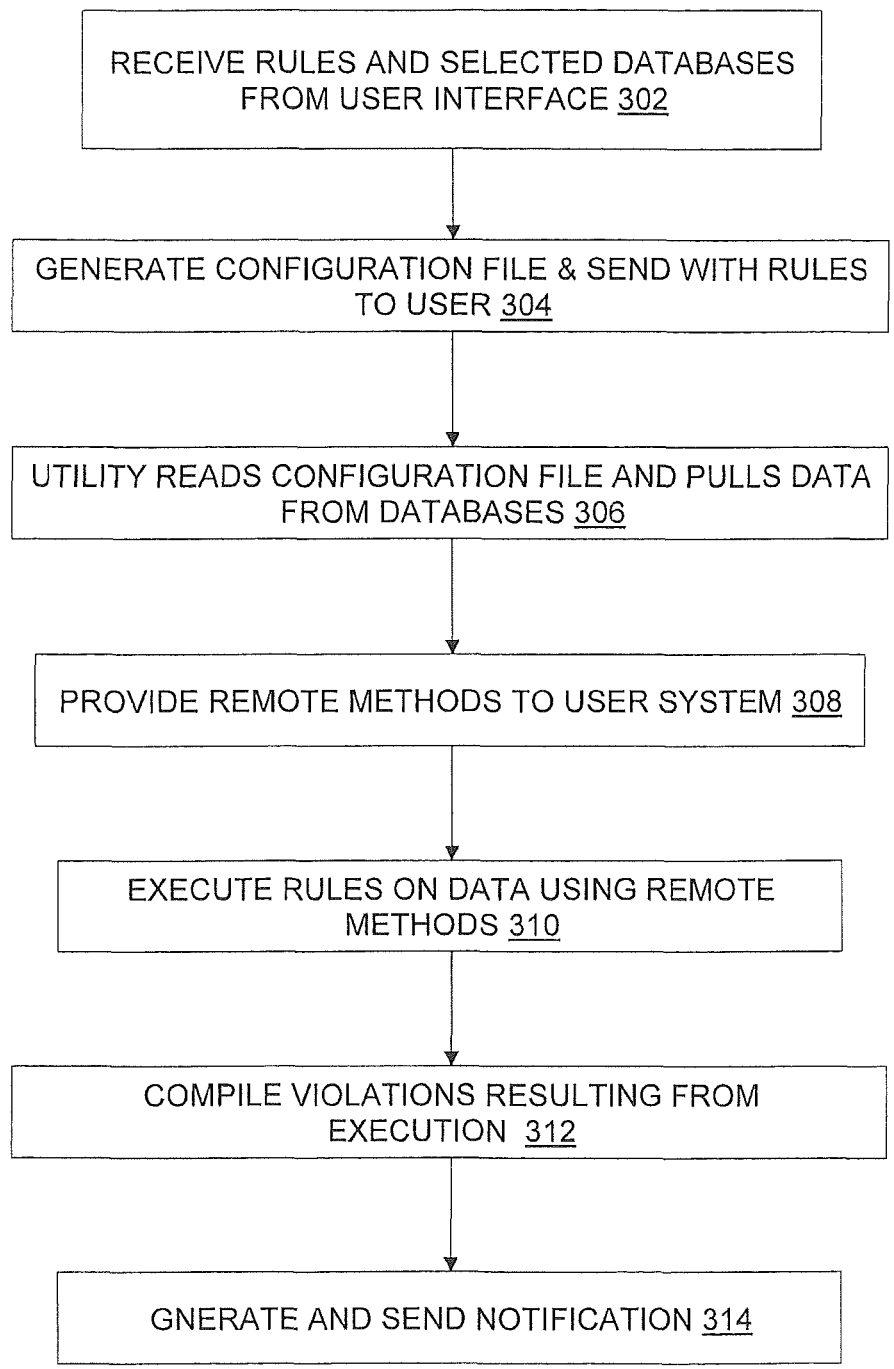
FIG. 3 is a flow diagram describing a process for implementing data validation services using a customer centric approach in an exemplary embodiment.

Turning now to FIG. 3, a customer centric approach to implementing the data validation services offering will now be described in an exemplary embodiment. In the customer centric approach, the processing of the data is performed on the customer side (e.g., by the user system 102 for the organization). This approach may provide a greater level of privacy but may utilize greater computational power from the customer than the provider centric approach. A computationally heavyweight utility (e.g., utility 108) may be downloaded on the customer side (e.g., the user system 105). In an embodiment, the service provider system 102 provides remote methods representing the validation services 180 to the user system 105. The service provider system 102 may store a global methods repository (not shown) for this purpose, as described herein.

At step 302, the user at the user system 105 accesses the user interface of the rules authoring service module 110 and specifies the rules via the form 104. The rules are converted to a file (e.g., XML file). The user selects the databases from the data sources 106 for which the services are desired.

At step 304, the data in the form is sued by the validation services 180 to generate a configuration file. The configuration file and the rules are passed from the rules authoring service module 110 to the user system 105 via the networks 190 and the integration layer 150. Note that in the provider centric approach, the rules are not sent to the customer side. The configuration file may also contain the address where the executable code corresponding to the rules is available.

At step 306, the utility 108 receives the configuration file and the rules and pulls the relevant data from the data sources 106.

At step 308, pertinent remote methods representing all or a portion of the modules 110, 120, 130, and 140 are downloaded from the service provider system 102 to the user system 105 over the networks 190 and the integration layer 150 using, e.g., Remote Method Invocation (RMI) from the global methods repository.

At step 310, the remote methods are executed with the pulled data as input.

At step 312, data violating the rules responsive to the data validation process (i.e., implementation of the remote methods) is then sent to the output services 140 running on the customer side (e.g., user system 105).

At step 314, a notification is generated and sent, along with associated reports, to the service provider system 102 via the networks 190 and the integration layer 150.

As indicated above, a third variation of the data validation services offering includes a report centric approach. In this approach, the processing of rules is performed as described in the customer centric approach; however, the data violations are transferred to the service provider system 102 for reporting purposes. In order to generate rich reports that support interactive features, such as drill down, rollup, filters, etc., sophisticated tools, such as Cognos™, are typically used, which may require licenses, hardware, maintenance, etc., resulting in increased overhead for the customer. By providing the results of the data validation services to the service provider (e.g., the service provider system 102), the customer may access the reports without the added costs associated with report generation using the above-referenced tools. The process involved in the report centric approach mirrors that of the customer centric approach except the output services module 140 is not downloaded (as described in step 308) to the user system 105, and the data violations resulting from the validation processes are transmitted to the output services module 140 running on the service provider side (e.g., the service provider system 102) via the networks 190 and the integration layer 150. A notification is generated and the user system 105 accesses the reports from the networks 190 and integration layer 150.

As indicated above, a user of the organization may define rules for the data validation processes through the form 104 and user interface of the rule authoring services 110. It will be understood that any type of data validation tasks may be created by a rule. For illustrative purposes, five sample rules are described herein.

Figure 4:
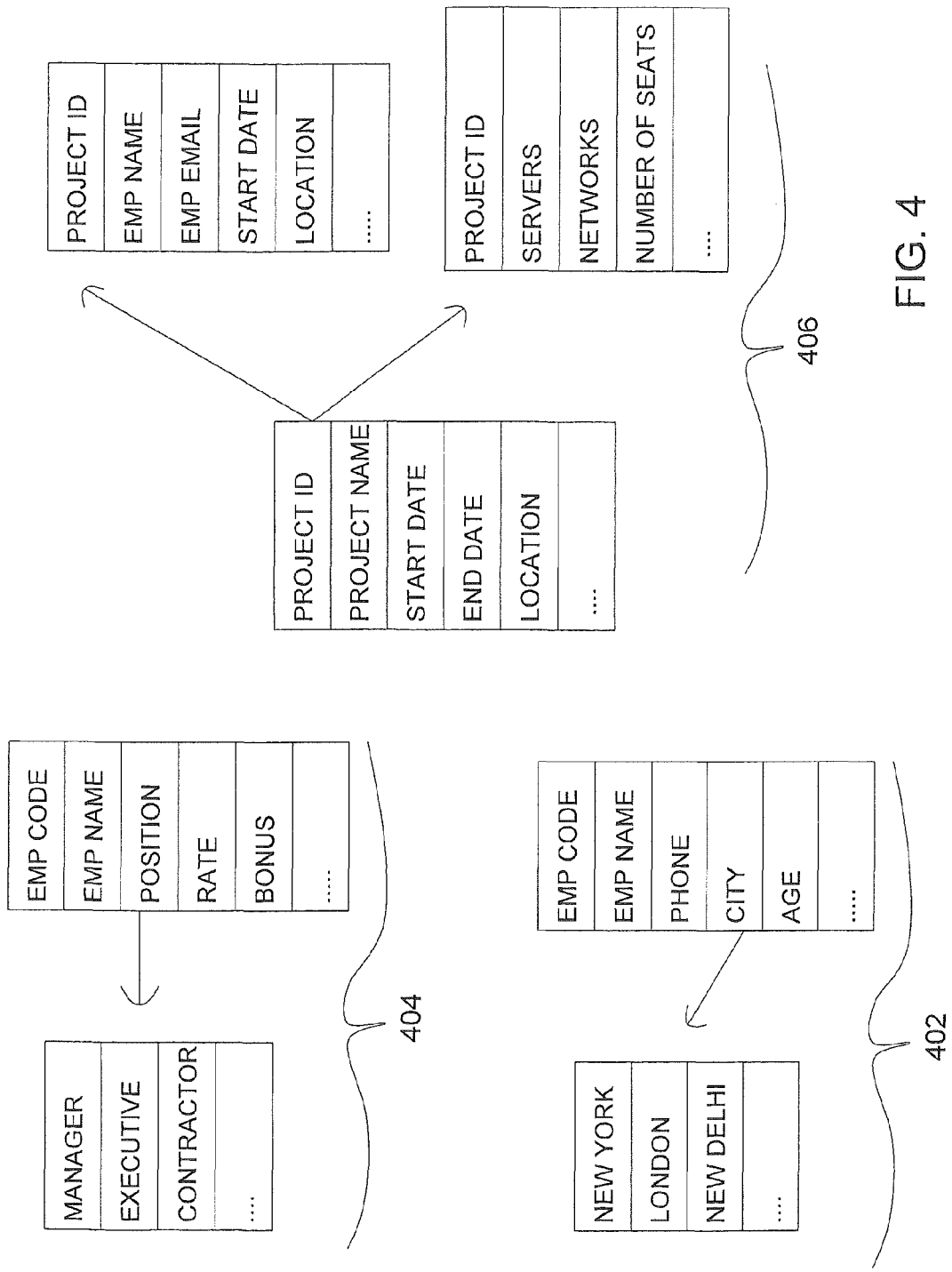
FIG. 4 is a sample organizational database infrastructure.

Turning now to FIG. 4, a sample organizational database infrastructure 400 will now be described in conjunction with the five sample rules. As shown in FIG. 4, the organization employs three different databases: a human resources (HR) database 402, a Payroll database 404, and a Project database 406. Rules created for various data validation tasks applicable to the databases 402, 404, and 406 may be created. An XML file for five sample rules that apply to the databases 402, 404, and 406 will now be described.

One data validation task relates to determining missing data. Missing data is a common data check because the database schema utilized by the organization may not have 'NOT NULL' constraint except for a primary key. For example, the rule is "Find employees such that phone number is missing," which is executable on the HR database 402. The rule created is provided as follows:

```
<rule type="MissingVal">
    <name>Missing Phone Number</name>
    <datasource> hrdata.comp.com$5000$dbadmin$dbpwd</datasource>
    <database>HR_DATA</database>
    <table>EMPLOYEE_DETAILS</table>
    <column>Phone_Number</column>
    <datatype>VARCHAR</datatype>
    <function></function>
    <rangetype></rangetype>
    <value></value>
</rule>
```

Another data validation task relates to performing a 'range' check. An example rule is "Find all employees such that the age is between 56 and 58," which is executable on the HR database 402. This information may be desired to ensure the employees for which Payroll is initiating a retirement process are indeed up for retirement within a year or two. The rule created is provided as follows:

```
<rule type="range">
    <name>Old Employees</name>
    <datasource>hrdata.comp.com$5000$dbadmin$dbpwd</datasource>
    <database>HR_DATA</database>
    <table>EMPLOYEE_DETAILS</table>
    <column>AGE</column>
    <datatype>INTEGER</datatype>
    <function></function>
    <rangetype>gtle</rangetype>
    <value>56|58</value>
</rule>
```

The above-listed rules may be configured to operate on multiple tables belonging to a single database. 'Multi-datasource' is a data validation task that checks data across different databases. An example of a rule is "Check whether location in Assignment table in the project database complies with the city in the employee details in HR database," which is executable on HR database 402 and Project database 406. The rule created is provided as follows:

```
<rule type="multidb">
    <name>Location Check</name>
    <datasource>projectdata.comp.com$5000$dbadmin$dbpwd|
hrdata.comp.com$5000$dbadmin$dbpwd</datasource>
    <database>PROJECT|HR_DATA</database>
    <table>ASSIGNMENT|EMPLOYEE_DETAILS</table>
    <column>LOCATION|CITY</column>
    <datatype>VARCHAR</datatype>
    <function></function>
    <rangetype></rangetype>
    <value></value>
</rule>
```

Another data validation task relates to performing a 'regular expression' check. An example rule is "Check if all the phone numbers are in xxx-xxx-xxxxxxx format," which is executable on the HR database 402. The rule created is provided as follows:

```
<rule type="regex">
    <name>Phone Number Format</name>
    <datasource>hrdata.comp.com$5000$dbadmin$dbpwd</datasource>
    <database>HR_DATA</database>
    <table>EMPLOYEE_DETAILS</table>
    <column>PHONE</column>
    <datatype>VARCHAR</datatype>
    <function></function>
    <rangetype></rangetype>
    <value>[0-9]{3} - [0-9]{3} - [0-9]{7}</value>
</rule>
```

A rule may be created for performing an aggregate function. The aggregate function rule may be configured to use operators, such as count, sum, average, min, and max. An example rule is "Check if the billing data per project is consistent with the number of employees assigned to the project," which is executable on the Project database 406. The number of employees per project may be generated using the rule shown below. Later, the multi-source rule can be invoked to compare this number with a billing database (not shown).

```
<rule type="aggregate-fn">
<name>No. of projects for Bob</name>
<datasource>projectdata.comp.com$5000$dbadmin$dbpwd</datasource>
<database>PROJECT</database>
<table>ASSIGNMENT</table>
<column>EMPLOYEE_NAME</column>
```

-continued

```
<datatype>VARCHAR</datatype>
<function>COUNT</function>
<rangetype></rangetype>
<value>BOB WILSON</value>
</rule>
```

Technical effects include providing data validation as a service. The data validation service provides a user interface for enabling subscribers of the service to define rules and select databases on which the service is to be performed. The data validation service creates a configuration file from information provided via the user interface and provides a client application to the subscribers for processing, in part, the configuration file and pulling data from the databases for validation. The validation service performs the data validation on the selected databases and provides reports containing results of the validation in a format specified by the subscribers.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of performing data validation as a service, comprising:
    providing a user interface to a subscriber of the service via a computer device of the subscriber to submit a request to perform a data validation service;
    prior to generating a configuration file, receiving, via the user interface, the request to perform the data validation service, and at least one data validation rule specified by the subscriber and an address of a database subject to the request to perform the data validation service;
    prior to sending available remote methods to the subscriber for executing the at least one data validation rule specified by the subscriber, generating the configuration file based on the address of the database received at the user interface and an address of a location of executable code corresponding to the at least one data validation rule received at the user interface;
    transmitting over the network via a service provider system the configuration file and the available remote methods to the computer device of the subscriber that is remotely located from the service provider and, after receiving the available remote methods transmitted from the service provider system, selecting by the subscriber at least one remote method among the available remote methods stored at the service provider system via the user interface, the selecting the at least one remote method occurring at the remotely located computer device of the subscriber that is located remotely from the service provider, wherein the configuration file is created independent and without respect to the remote methods;

transmitting the at least one selected remote method among the available remote methods from the service provider system to the remotely located computer device of the subscriber that is remotely located from the service provider, and executing the at least one data validation rule including pulling data for validation from the database indicated at the address;

transmitting, to the service provider system, the pulled data for validation from the remotely located computer device of the subscriber that is remotely located from the service provider system, the service provider system configured to execute the data validation rule with respect to the data and compile results of the execution remotely from the computer device of the subscriber according to the at least one selected remote method transmitted by the subscriber among the available remote methods; and receiving the results of execution of the rule and providing the computer device of the subscriber with access to the results over the network, the providing includes generating at least one report containing the compiled results of the execution remotely from the computer device of the subscriber according to the at least one selected remote method, and wirelessly sending the at least one report from the service provider system to the computer device of the subscriber that is remotely located from the service provider.

2. The method of claim 1, further comprising:
receiving a metadata model of the database, the metadata model specifying a schema of the database.

3. The method of claim 1, wherein the data validation rule includes at least one of:
a missing data task;
a range check; and
a regular expression check.

4. The method of claim 1, wherein the data validation rule is configured to operate on multiple database tables in the database.

5. The method of claim 1, wherein the data validation rule is configured to perform an aggregate function on the data.

* * * * *